United States Patent [19]

Peting

[11] Patent Number: 4,506,919
[45] Date of Patent: Mar. 26, 1985

[54] RESTRAINED MECHANICAL PIPE JOINT
[75] Inventor: Robert G. Peting, Oak Forest, Ill.
[73] Assignee: Amsted Industries Incorporated, Chicago, Ill.
[21] Appl. No.: 455,019
[22] Filed: Jan. 3, 1983
[51] Int. Cl.³ .............................................. F16L 5/00
[52] U.S. Cl. .................................. 285/231; 285/348; 285/374
[58] Field of Search ............... 285/331, 337, 374, 348, 285/416, 332.3, 231

[56] References Cited
U.S. PATENT DOCUMENTS

| 2,464,744 | 3/1949 | Fennema | 285/337 X |
| 2,832,615 | 4/1958 | Summers | 285/348 X |
| 3,433,509 | 3/1969 | Jeffery et al. | 285/374 |
| 3,698,744 | 10/1972 | Bevington | 285/416 X |
| 3,720,428 | 3/1973 | Zastawny | 285/416 X |
| 3,844,587 | 10/1974 | Fuhrmann et al. | 285/332.3 X |
| 3,910,610 | 10/1975 | Turner et al. | 285/337 |
| 4,239,266 | 12/1980 | Mynhier | 285/348 X |

FOREIGN PATENT DOCUMENTS 1319596  6/1973  United Kingdom ................ 285/337

Primary Examiner—Dennis L. Taylor
Attorney, Agent, or Firm—Charles E. Bouton; Fred P. Kostka

[57] ABSTRACT

A restrained mechanical pipe joint including a spigot end of one pipe seated in a socket end of a second end or a fitting. The joint includes a single tightening means and a restraining ring formed to permit limited misalignment of the longitudinal axes of the spigot and socket pipe ends.

4 Claims, 2 Drawing Figures

U.S. Patent  Mar. 26, 1985  4,506,919
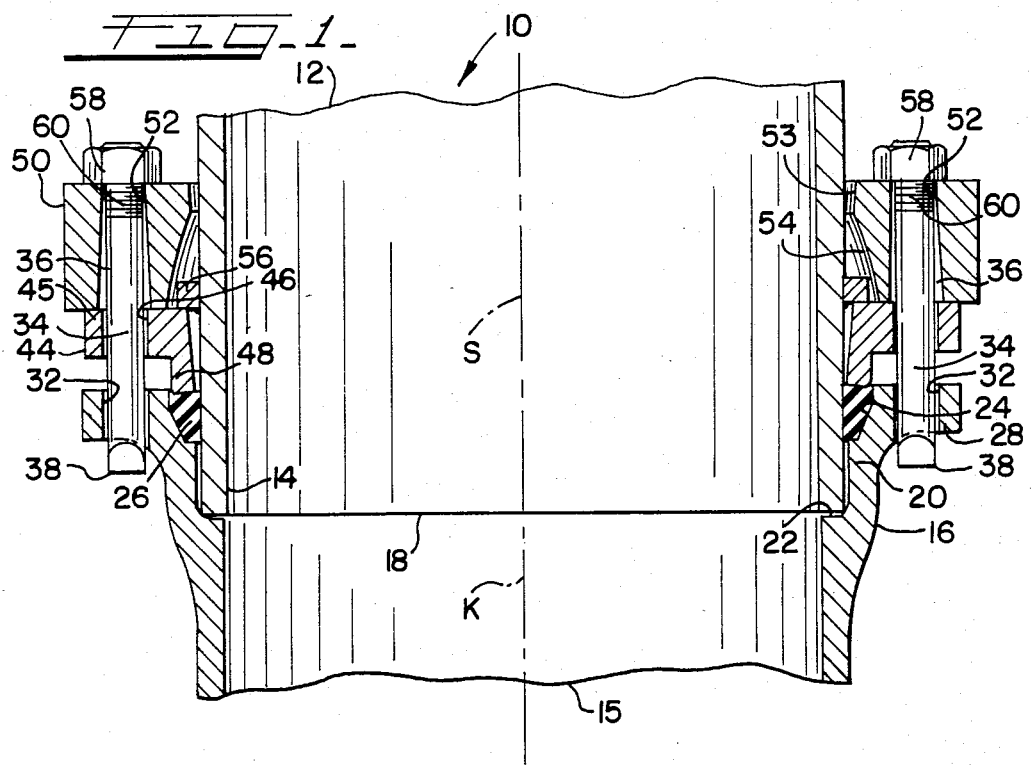
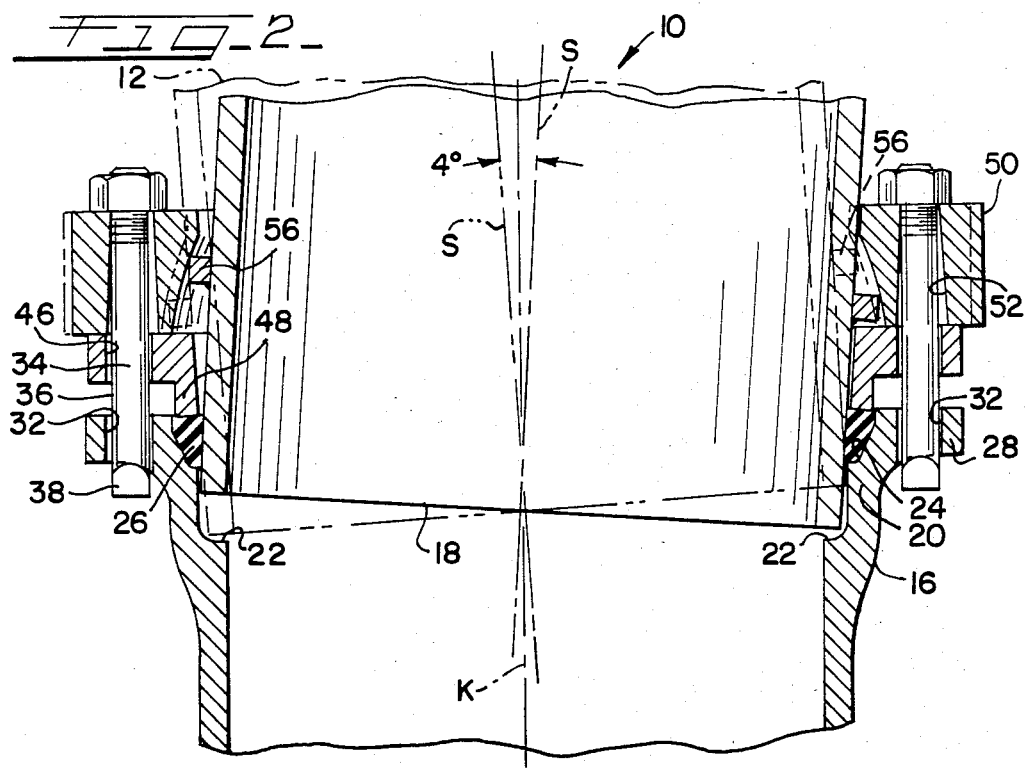

RESTRAINED MECHANICAL PIPE JOINT

FIELD OF THE INVENTION

The present invention relates to joints for bell and spigot type couplings such as commonly used for pipe and fittings and more particularly to an improved restrained mechanical joint.

PRIOR ART

Restrained mechanical joints of the type to which the present invention relates generally comprise a first pipe or fitting section having a socket on one end which receives a spigot end of a second pipe. A resilient sealing gasket disposed on the spigot end is seated in the socket to provide a seal at the joint. The gasket is compressed in the socket by a mechanical joint gland which is secured by a plurality of radially spaced T-bolts or the like. The mechanical joint gland is forced into engagement with gasket by means of nuts threaded on the bolts. The spigot end is held in the socket by a restraining flange which is held in place by the radially spaced T-head bolts by the use of a second nut on same. The restraining flange abuts a ring fixedly fastened to the spigot inwardly from the terminal end thereof.

SUMMARY OF THE INVENTION

By the present invention it is proposed to provide an improved restrained mechanical pipe joint which is of simpler construction and which facilitates the assembly of the joint.

This improved mechanical joint is also constructed to permit the assembly of the pipe or pipe and fitting when the longitudinal axes are misaligned.

This is accomplished generally by a pipe joint including a pipe or fitting having a socket and another pipe having spigot end pipe restraining means including a ring fixed to the spigot and a gasket. A retainer ring is disposed about the spigot and overlies an annular gland. A plurality of bolts extending between the retainer ring and the socket serve to clamp the gland against the gasket. The retainer ring is formed along its inner circumference with a concave surface which is engagable with the spigot ring whereby the axes of the spigot end and the axes of the socket end may be in misalignment while at the same time maintaining the uniform thrust loading. Such thrust loading is achieved by a plurality of nuts threaded on the ends of the bolts extending beyond the retainer ring.

Upon tightening of the nuts on the bolts the retainer ring is guided about the pipe surface into engagement with the gland to force the gland to compress the gasket and at the same time seat the free end of the spigot into the socket.

BRIEF DESCRIPTION OF THE DRAWINGS

FIG. 1 is a cross sectional view of a restrained mechanical joint assembly embodying the structure of the present invention with the spigot and socket pipes in axial alignment.

FIG. 2 is a view similar to FIG. 1 but showing the spigot and socket ends out of axial alignment.

DESCRIPTION OF THE PREFERRED EMBODIMENT

Referring now to the drawings, there is shown a restrained mechanical joint assembly 10 embodying the structure of the present invention for joining a pipe 12 having a spigot end 14 and a pipe or fitting 15 having a socket end 16.

The spigot end 14 is substantially a hollow cylinder having a terminal end 18. The socket end 16 is provided with a bell mouth 20 having an internal ledge 22 against which the spigot terminal end 18 is adapted to seat. A peripheral recess 24 is formed about the outer end of the mouth 20 for accommodating a resilient gasket 26 disposed about the spigot end. A restraining flange 28 projects about the periphery of the bell mouth 20 and is formed with a plurality of angularly spaced bolt openings 32.

Slidably accommodated with the openings 32 are shanks 34 of bolts 36 having a head 38 underlying the flange 28. The opposite end of the bolts 38 are each threaded and have a nut 58 fastened thereon. Preferrably the bolts 36 are T-bolts of which the heads 38 are in the form of a T.

Disposed about cylindrical surface of the spigot end 14 is the resilient gasket 26 made of a synthetic material or rubber or the like. The gasket 26 is adapted to seat within the peripheral recess 24 and provide a seal.

Compressing the gasket 26 within the recess 24 is a gland 44. The gland 44 includes an annular body 45 having a plurality of angularly spaced openings 46 which slidably accommodate the shanks 34 of the bolts 36. Extending and projecting along the inner wall of the annular body 45 is an annular flange 48 of a width no greater than the spacing between the wall of the gasket recess 24 and the outer circumference of the spigot end 14. The flange 48 serves to compress the gasket 26 into the groove and maintain a seal as more fully to be explained hereinafter.

An annular retaining ring 50 having a plurality of openings 52 slidably receiving the shanks 34 of the bolts 36 overlies the gland 44. The inner diameter of the retaining ring 50 loosely accommodates the spigot end therein.

In accordance with the present invention the inner cylindrical wall 53 of the retaining ring 50 is partially cut away to form a concave surface 54 which engages the spigot ring 56 (fixed as by welding to the spigot) along its outer edge remote from the terminal end 18. Preferably as shown the concave surface 54 is spherical having a radius of curvature permitting about a 4° misalignment of the longitudinal axes S and K respectively of the spigot and socket upon assembly of joint 10 as shown in FIG. 2.

The joint 10 is assembled by welding the spigot ring to the spigot end and thereafter inserting the spigot end 14 into the bell mouth with the gasket 26 and gland 44 carried by the spigot end disposed in the bell mouth recess 24. The bolts 36 are then inserted through the openings 32, 46 and 52 in the flange 28, gland 44 and retaining ring 50. The gland 44 is arranged so that the projecting flange 48 engages the gasket 26.

Nuts 58 are then assembled on the threaded ends of the bolts 36 and tightened. Upon tightening of the nuts 58 the retaining ring 50 is drawn toward the restraining flange 28 and is guided by engagement of the inner cylindrical wall along the concave surface 54 thereof with the spigot ring 56. Should the longitudinal axes S and K of the spigot end 18 and the socket 16 be misaligned such misalignment is accommodated by the concave or spherical surface 54 which permits limited relative rocking of the spigot 14 and socket 16 during tightening of the joint.

As the retaining ring 50 is drawn toward the restraining flange 28, the gland is simultaneously drawn toward the gasket 26 to compress the latter and assure a proper seal at the joint. Upon achieving a firmly tightened gasket, tightening of the nuts is stopped.

What is claimed is:

1. A restrained mechanical pipe joint assembly for joining a spigot to a socket end including an enlarged base for receiving said spigot and an annular gasket accommodating recess and an outwardly projecting restraining flange having a plurality of angularly disposed openings, said mechanical joint assembly comprising:
   (a) a spigot ring fixedly secured to said spigot spaced inwardly from the terminal end thereof;
   (b) a compressible gasket seated in said gasket accommodating recess;
   (c) a bolt assembly including a head underlying said restraining flange and a shank having a threaded end and nut threaded thereon, said bolt shank loosely accommodated within said flange openings;
   (d) a retaining ring having a plurality of openings angularly spaced complementary to said restraining flange openings and loosely receiving the shanks of said bolts, said retaining ring having an inner annular surface of said spigot end and a concave surface engagable with said spigot ring thereby permitting limited axial misalignment of said spigot and socket longitudinal axes; and
   an annular gland disposed between said retainer ring and said restraining flange so that upon tightening of said bolt assembly said spigot is secured in said socket and said gasket is compressed into sealing engagement with said spigot.

2. The invention as defined in claim 1 wherein said concave surface is a spherical surface.

3. The invention as defined in claim 2 wherein said annular gland includes a flange for compressing said gasket into said gasket accommodating recess.

4. The invention as defined in claim 3 wherein said gland includes a plurality of bolt hole opening for accommodating said bolts.

* * * * *